US012810221B1

(12) United States Patent
Nia

(10) Patent No.: US 12,810,221 B1
(45) Date of Patent: Nov. 24, 2026

(54) ON SYSTEMS DESIGN FOR PROJECT MANAGEMENT: PROJECT FEASIBILITY AND TASK PLANNING PROCEDURES

(71) Applicant: Payam Mahmoodi Nia, Pleasanton, CA (US)

(72) Inventor: Payam Mahmoodi Nia, Pleasanton, CA (US)

( * ) Notice: Subject to any disclaimer, the term of this patent is extended or adjusted under 35 U.S.C. 154(b) by 0 days.

(21) Appl. No.: 19/008,525

(22) Filed: Jan. 2, 2025

(51) Int. Cl.
*G06Q 10/06* (2023.01)
*G06Q 10/0631* (2023.01)
*G06Q 10/0637* (2023.01)
*G06Q 10/0639* (2023.01)
*G06Q 10/10* (2023.01)

(52) U.S. Cl.
CPC ................. *G06Q 10/06313* (2013.01); *G06Q 10/063114* (2013.01); *G06Q 10/0637* (2013.01); *G06Q 10/06398* (2013.01); *G06Q 10/103* (2013.01)

(58) Field of Classification Search
CPC ...................................................... G06Q 10/06
See application file for complete search history.

(56) References Cited

U.S. PATENT DOCUMENTS 8,781,882 B1 * 7/2014 Arboletti ............ G06Q 10/0639 705/7.41
2017/0116552 A1 * 4/2017 Deodhar ............ G06Q 10/0639
2017/0236081 A1 * 8/2017 Grady Smith ..... G06Q 10/0637 705/7.36
2024/0144141 A1 * 5/2024 Cella .................. G06Q 30/0202
2024/0412720 A1 * 12/2024 Vasylyev .......... G06F 16/90332

FOREIGN PATENT DOCUMENTS

WO WO-2015029073 A2 * 3/2015 ......... G06Q 10/1091

* cited by examiner

*Primary Examiner* — Kurtis Gills
(74) *Attorney, Agent, or Firm* — Michael D. Eisenberg; MDE Patents

(57) ABSTRACT

A platform for project management is disclosed. The platform enforces a blueprint with a plurality of layers of artificial intelligence (AI), wherein the blueprint comprises: procedural steps directed to project feasibility and task assignment; task clustering; project task-lead assignment; protocols for AI-use cases; automation steps and statistic analytics and process, generated by AI; critical task pool generation steps, sub-task and reporting population process, and project task assignment and feasibility studies; and strategy on alignment for each step.

19 Claims, 9 Drawing Sheets

Top Threshold: budget to meet main and key requirements

Adjustable Horizon: provides room for future negotiations

Bottom threshold: defines maximum allowed project budget

ON SYSTEMS DESIGN FOR PROJECT MANAGEMENT: PROJECT FEASIBILITY AND TASK PLANNING PROCEDURES

FIELD OF INVENTION

The present invention is directed to systems and methods for aiding in project management. The focus of this invention is specifically on project task feasibility related studies and task definition and assignment. The process and methods defined are effectively using human operators', project leads', and stakeholders' handshake with artificial intelligence. The primary goal is to define a process that minimizes delivery failures concerning the project product requirements, limitations, budget, and risks associated with each task, by promoting an efficient and well-defined process in preparations prior to project development phase.

BACKGROUND

Every product throughout human history, which came into existence and sold on the market, is designed to remedy the problems that the originator of the product has observed. After working in technology industries with high expectations in production capacity and quality management, it is noticed that project stakeholders' communications and interactions can be prone to multiple sources of failure points in project deliveries of products (e.g., goods and services) to satisfy the project and customer demands and product requirements. The miscommunications can lead to misidentification of project requirements, tasks, budgets. All of which can decrease the possibilities of a final delivery or hitting project goals in time.

Customer chain of demands in a project delivery is a chain of loops, in which the customer is the initial loop and the final loop. A successful chain of loops is only possible by the "producer(s)" of the goods and services in the market. The producer is: (a) problem solver, (b) employees that provide the goods to the customer/market, and (c) the expertise/skills used by (a) and (b) to produce the deliveries. Additionally, customer demands require adherence to time, quality, and care, which are the "key product deliverables." If a producer includes these key product deliverables at each step of a project process, the final product will also have these quality factors.

Failure to meet project deadlines can have severe consequences, such as diminished revenue, customer loss, and a potential reduction in the workforce. For instance, a software company failing to deliver a product on time might lead to financial losses due to missed market opportunities and dissatisfied customers who may turn to competitors. Moreover, a delayed project in, for example, the construction industry could result in contractual penalties, strained client relationships, and increased operational costs.

The systems and methods herein address some of the key failure modes observed, when the expertise is used by (a) and (b) to deliver the project outputs and goals while meeting the key requirements of the project. Specifically, for this invention, addressing the problems observed in a portion of project task definition, assignment, and planning. Additionally, the systems and methods herein can address time, quality, and care for feasibility studies and task definition, planning, and assignments, which are associated with project deliveries. In the sequel, protocols will be defined that satisfy human approval and execution control over artificial intelligence (AI) techniques and methods, thereby resisting/preventing AI from taking over a project delivery.

The primary goal for artificial intelligence use-cases here, is to provide guidance and visibility to project stakeholders. This does not mean that all the guidance provided by the AI is absolute truth as it can also suffer from data bias and other AI failure points-some of which are described below. Therefore, an enforcement of human questioning and qualification at every step within the process is deemed necessary but not sufficient. Sufficient conditions to optimize project delivery manifest itself through the project cycle and by the enforcement of the process steps and protocols described here along with the development team culture and work ethics.

SUMMARY OF INVENTION

In a computer program product, computer system, and computer-implemented method of the systems and methods herein, a software package is disclosed for aiding in project management, with respect to task feasibility studies and task assignment procedures. The software package is a platform for project management, wherein the platform enforces a blueprint with a plurality of layers of artificial intelligence (AI), wherein the blueprint comprises: procedural steps directed to project feasibility; task definition; task clustering; project task-lead assignment; protocols for AI-use cases; possible and available automation steps and statistic analytics and processes, generated by AI; project critical task and sub-task generation steps, and reporting processes, and project task assignment and feasibility studies; and finally strategy on alignment recommended methods for each step. Furthermore, the process progression and delivery variables of the defined steps on the platform, is overseen by a separate AI platform to generate regular and informative reports and/or recommend for escalation routines and realignments steps, in case deviations from the defined steps is observed or if the project key requirements are estimated to be off schedule.

In a computer program product, computer system, and computer-implemented method of the systems and methods herein, the software package is a platform for connecting to databases, graphical user interfaces, and artificial intelligence and data analytics techniques. Whereby the platform enforces defined steps, for each of which, the variables and methods and decisions are led and managed by the defined project stakeholders within the program.

In a computer program product, computer system, and computer-implemented method of the systems and methods herein, the software package is a platform that can create reports on tasks and events related to each step status and its progress; can update reports containing each task; can guide in task dependency and interdependency analyses; can assist in determining tasks that are high risk; can assist in performing task hypothesis testing; can create automatic reports based on the hypothesis testing results; can assist in mitigation planning for the high-risk tasks; can create reports for mitigation planning and reports from final alignment steps and gatherings before project development phase begins.

In a computer program product, computer system, and computer-implemented method of the systems and methods herein, the software program is a platform for: creating and populating a general sheet for task feasibility and assignment, in form of a GUI with printable outputs, to be used by and shared with project stakeholders.

In a computer program product, computer system, and computer-implemented method of the systems and methods herein, the software program is a platform for enforcing the plurality of protocols to create, enforce and require human decision making and control over the project progression.

Namely: honest human decision making and execution; internal data control; data merge control; data preservation and encapsulation; task automation confirmation; human focus analysis; code correction; automation external safety analysis; and human imagination enforcement.

In a computer program product, computer system, and computer-implemented method of the systems and methods herein, the platform has a back-end configured for data integration, front-end-level data access and data security manager, data post-processing, data reporting, and a mid-end that covers a communications system, wherein the data integration comprises sublayers for data storage management, data pre-processing, data classification, back-end-level data access and security manager, and artificial intelligence communications.

In a computer program product, computer system, and computer-implemented method of the systems and methods herein, the AI observer generates real-time reports and alignments for recommendations on project planning and provides projections on associated risk, timeline and budget and delivery of all defined project tasks by observing the task status and schedule and providing to project stakeholders.

DETAILED DESCRIPTION OF FIGURES

FIG. 1 is a depiction of a computing environment in which module 105 of the systems and methods herein reside in and the other computing nodes, which module 105 communicates with.

Figure 5:
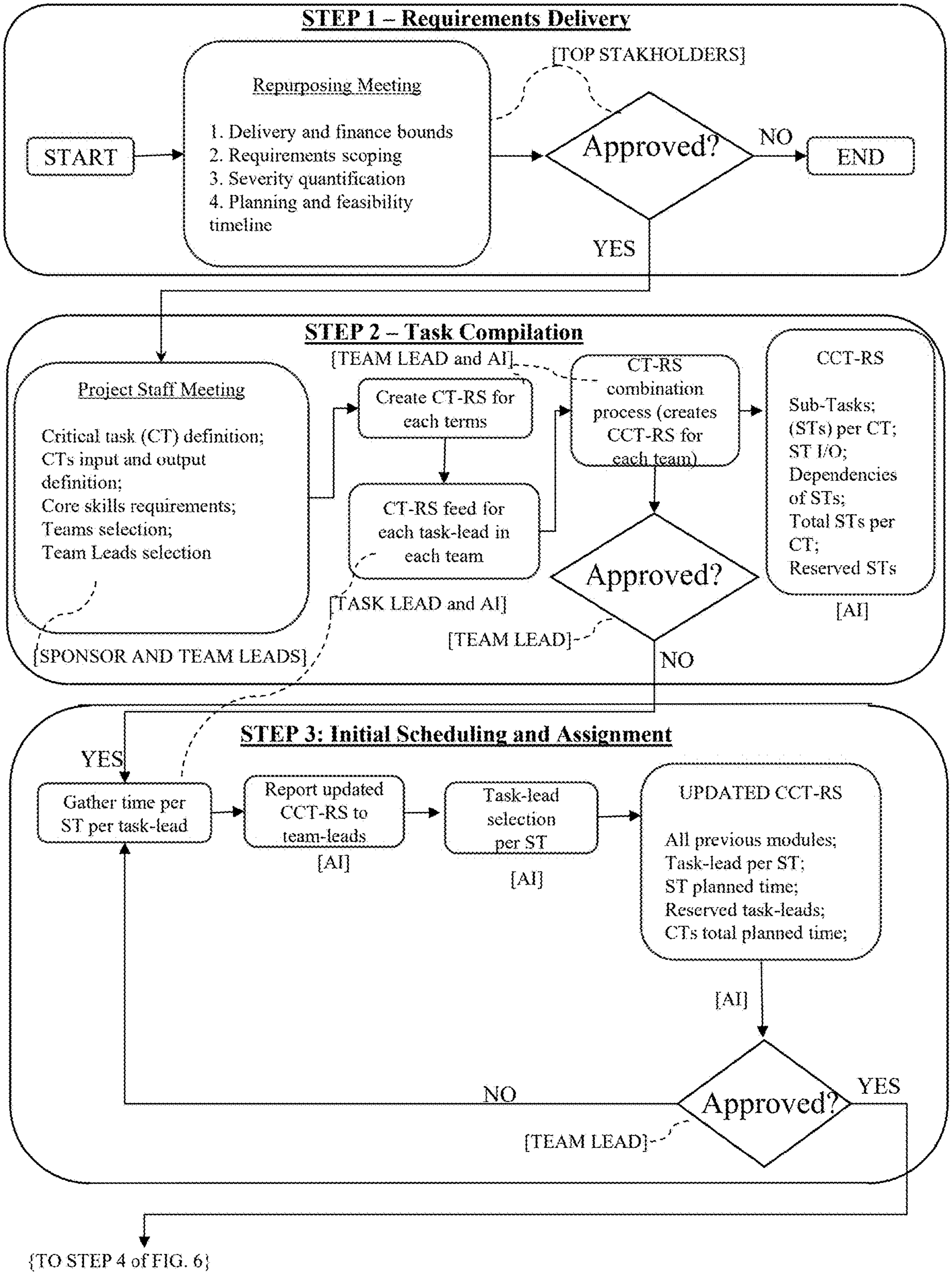
Figure 6:
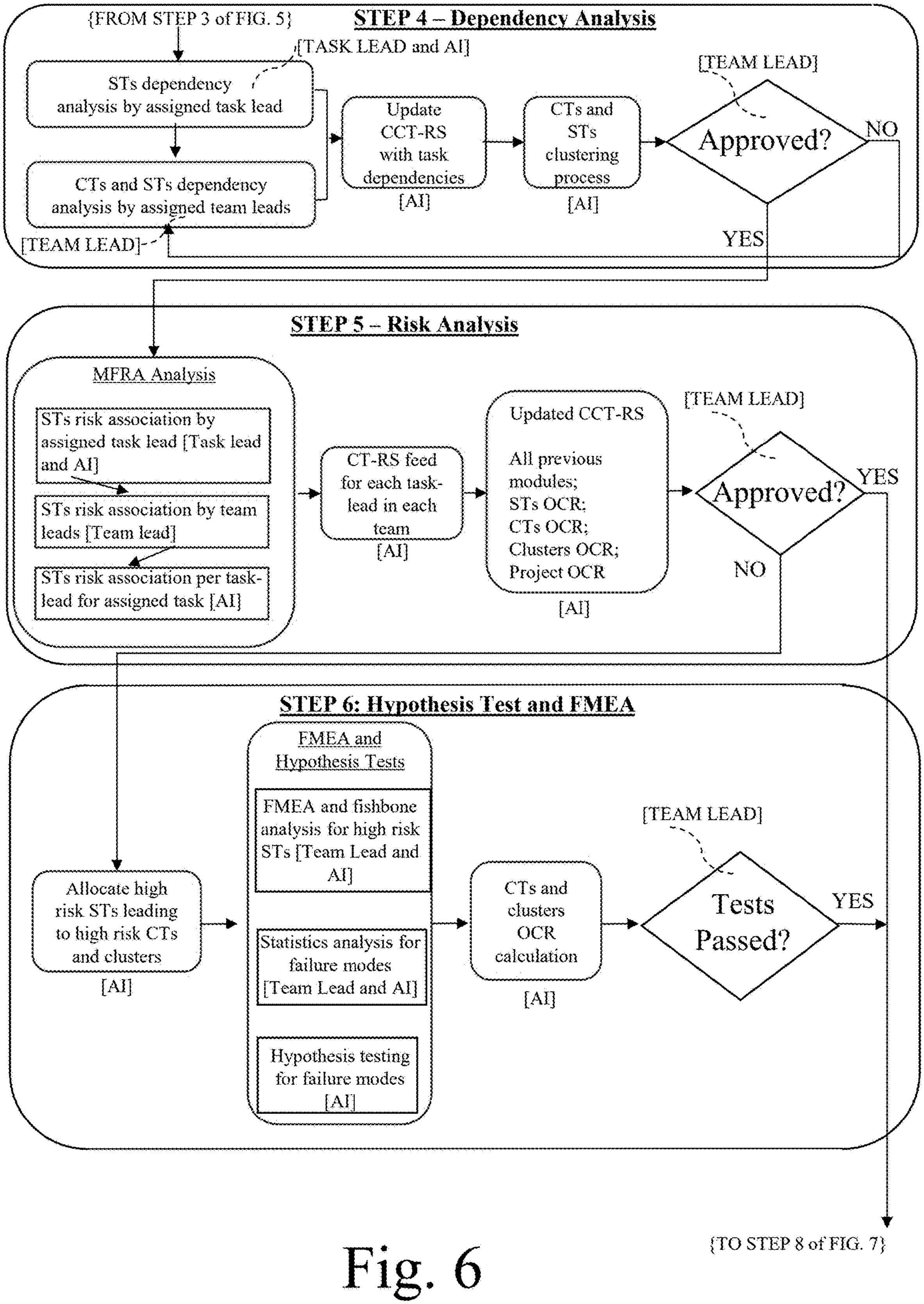
Figure 7:
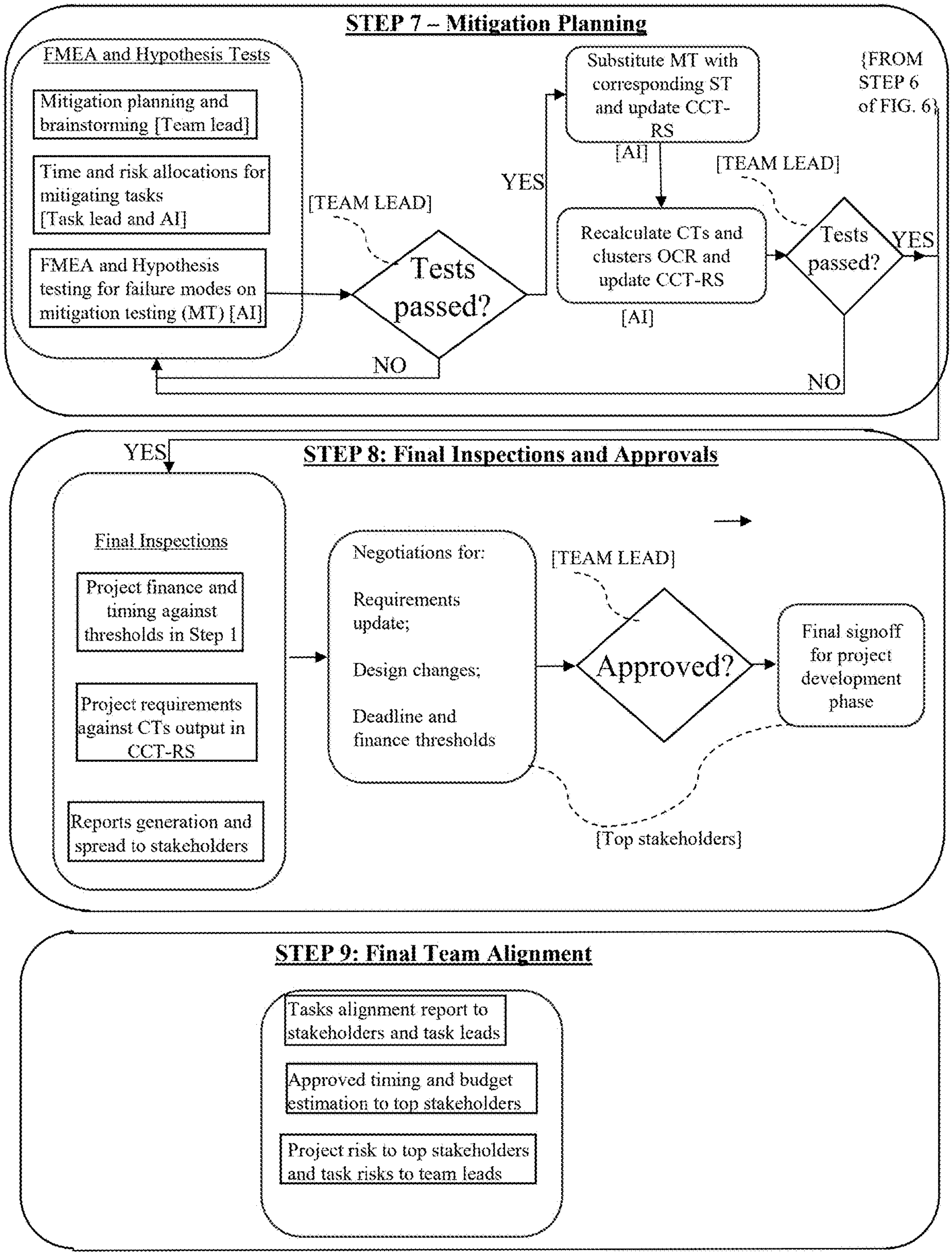

FIG. 5, FIG. 6, and FIG. 7 are depictions of flowchart 3 for project task assignment and feasibility studies, as implemented by module 105.

Figure 8:
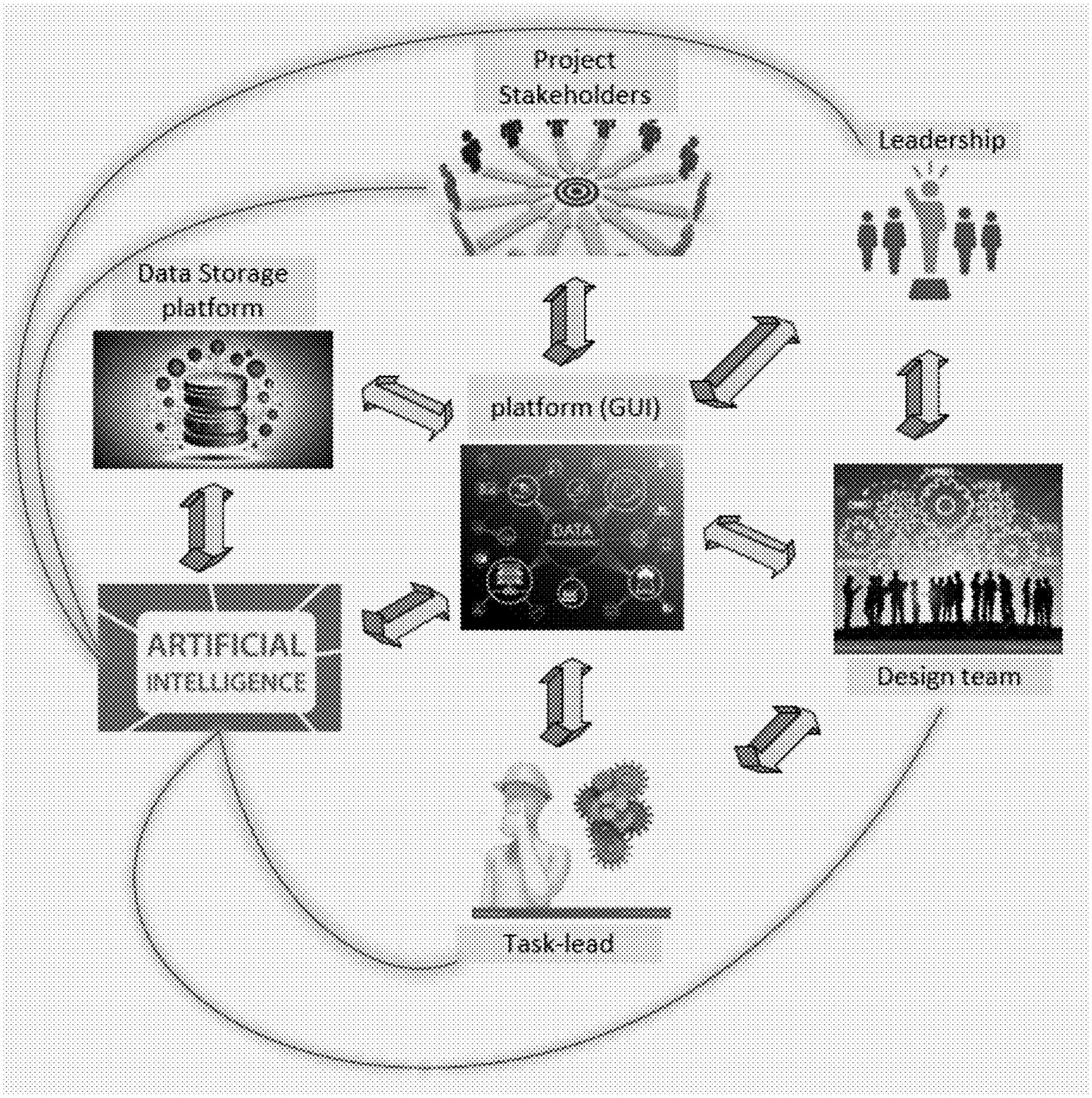

FIG. 8 is the general program layers diagram.

Figure 9:
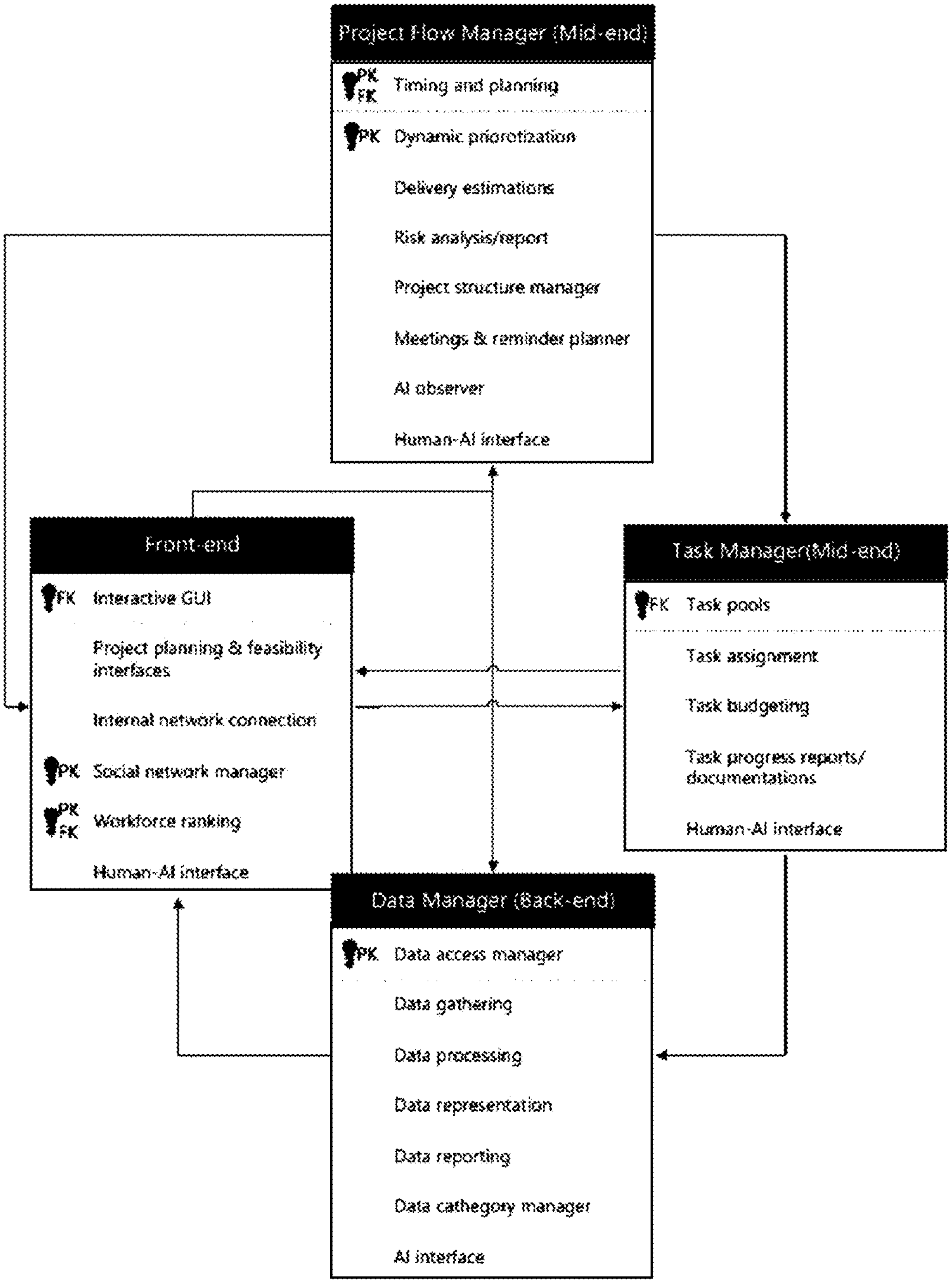

FIG. 9 is a depiction of the architecture of module 105.

Figure 10:
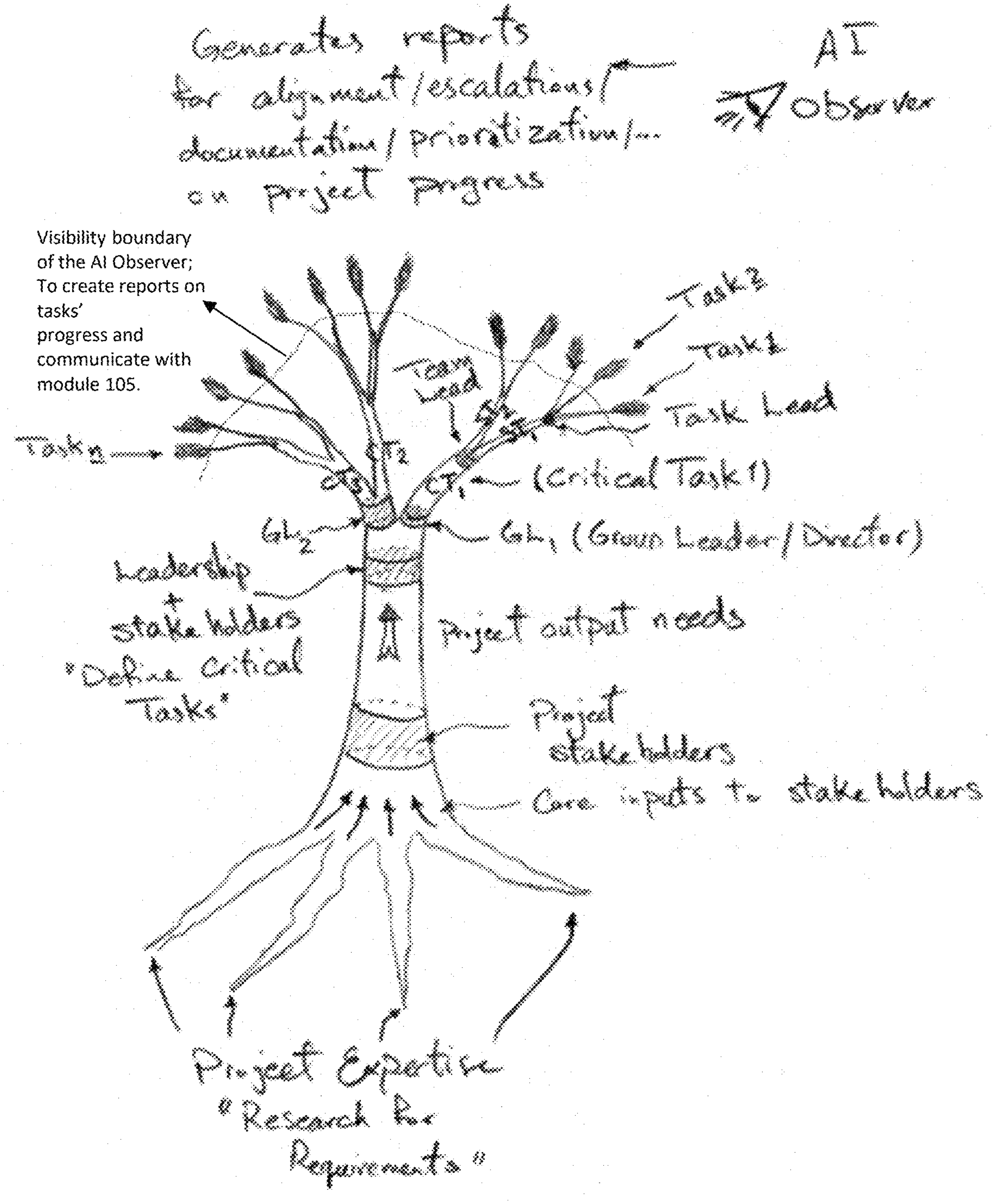

FIG. 10 depicts Process Architecture 1, which is symbolized by a tree, to define roles and modules in collaboration.

DETAILED DESCRIPTION

In the systems and methods described herein, a software package addresses the customer chain of demands, with respect to feasibility studies on tasks and development and assignment of tasks. Process within which has the goal to aid in the delivery of goods and services to market, by controlled handshake of human stakeholders and artificial intelligence (AI) techniques, for project management. The controlled AI techniques of the systems and methods herein enforce the human stakeholders being fully aware of AI use case protocols, while covering the following the two necessary conditions: (i) resistant to automated entities and processes taking over the project and (ii) having oversight on the artificial intelligence and human safe handshake by looking into tasks progress, inputs, and outputs.

In the systems and methods described herein, the software package can be module 105 that uses machine learning and advanced data processing techniques. The machine learning and data processing techniques, as used by module 105, can analyze, categorize, and recommend next steps in project tasks and development. While doing so, module 105 can enforce that each decision-making step is carefully questioned, assessed, and confirmed by project stakeholders (which MUST be human). This will also include a separate AI network entity that acts as an observer on tasks, providing warnings and predictions on the future of the project delivery and associated risks.

In the systems and methods described herein, module 105 enforce a blueprint for enhancing efficiency of project management for the delivery of goods and services, wherein the blueprint comprises the following sub-modules, wherein the sub-modules that performs complex primary function without outside interference, such as, the class library of an application that provides integration with e-mail (e.g., communication with server 107) or a database (e.g., communication with database 107) or the single application of a software suite. The sub-modules, as composed within the blueprint, can perform the following primary functions (1), (2), (3), (4), (5), (6), and (7).

Primary function (1) can be procedural steps, as defined in this document and their sequence and alignment level, as set by "Strategy" descriptions towards project feasibility and task assignment, as described with respect to FIG. 5, FIG. 6; and FIG. 7.

Primary function (2) can be general visibility of total project static risk at a reported time. based on a combination of task clustering and dependency, task-lead's individual risk, and task specific risk towards meeting deliverables.

Primary function (3) can be project task-lead assignment steps, based on a population gathering from all task-leads and elimination of lower bound task-lead outliers towards optimal assignment of tasks.

Primary function (4) can be protocols described for AI use cases, which provides an oversight on activities by human interventions and decision-making steps through the process and connection with the Observer AI. Other sub-protocols can be added as amendments to the general 9 protocols (process A), as more investigation takes place on possible AI and/or Human interaction failures. Observer AI is solely responsible for assisting in delivery of project tasks status, estimation in budgets and future needs and generating or drafting reports through the process. The main reason for using this separate but communicative entity (Observer AI) is to minimize the risks associated with miss-communications or lack of documentation at every step of the process.

Primary function (5) can be all automation steps and statistical analytics and processes, generated by AI running on the back-end after acquiring necessary input data for each step.

Primary function (6) can be the steps in Flowchart 1-3, architectures, and procedures, as defined by graphs and written steps.

Primary function (7) can be the strategy on stakeholders' alignments for each step within the flowchart 1-3. While the strategies are recommended within the flowcharts, they can be redefined, by project top stakeholders, based on the project team structure and/or producer functional structure.

Figure 1:
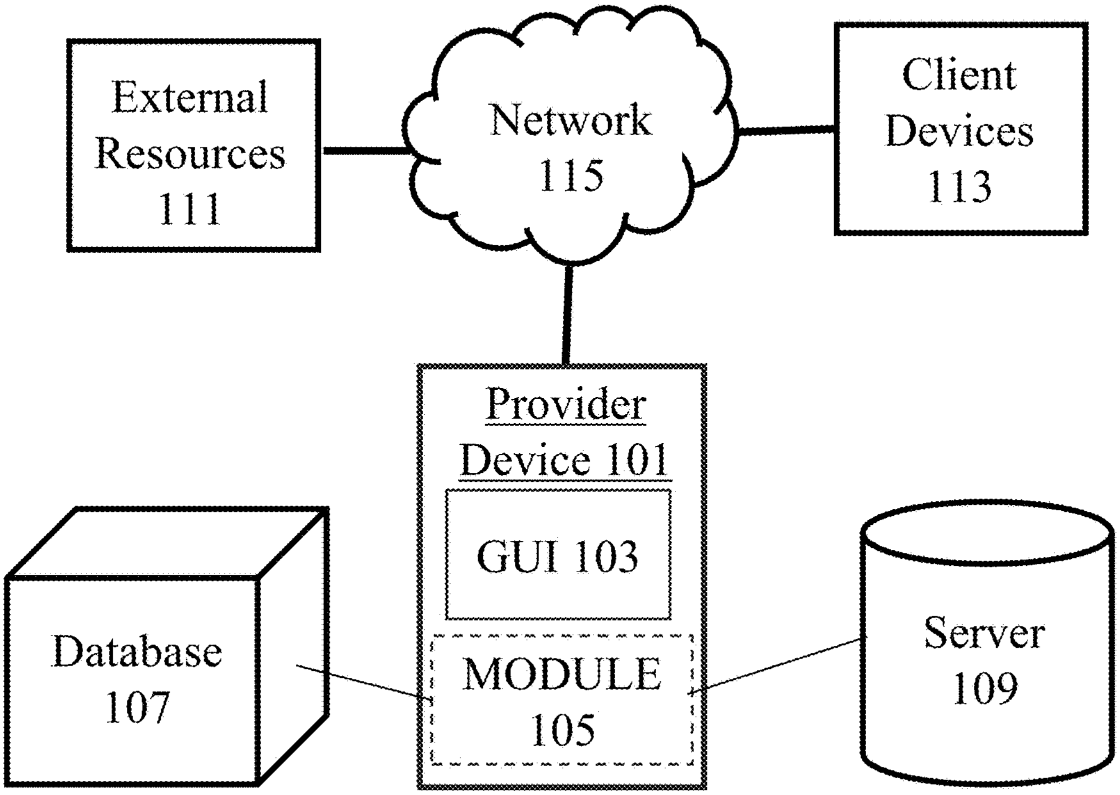

In FIG. 1, provider device 101, which is used by human operators of the project management team, can connect through network 115, to establish telecommunication or internet connection with clients via client devices 113 and external resources 111, in a computing environment for use in project management to deliver goods and services to the market. The layers of said project management (see FIG. 8) can be managed by module 105, which is a software program displayed and used, as a platform in a graphical user interface (GUI), such as GUI 103, wherein the platform connects to the following layer: task-lead, design team, leadership, project stakeholders, and data storage, thereby creating a digitized project management network.

Module 105 can be a software program that resides provider device 101, which connects to: (i) graphical user interface (GUI) 103; (ii) one or more units of database 107, which resides locally within provider device 101 and/or externally to provider device 101; (iii) and one or more units of server 109, which reside locally within provider device 101 and/or externally to provider device 101. GUI 103, which can reside on provider device 101, has buttons, icons, and menus in a digital interface that allows a user of provider device 101 to interact with electronic devices.

Figure 3:
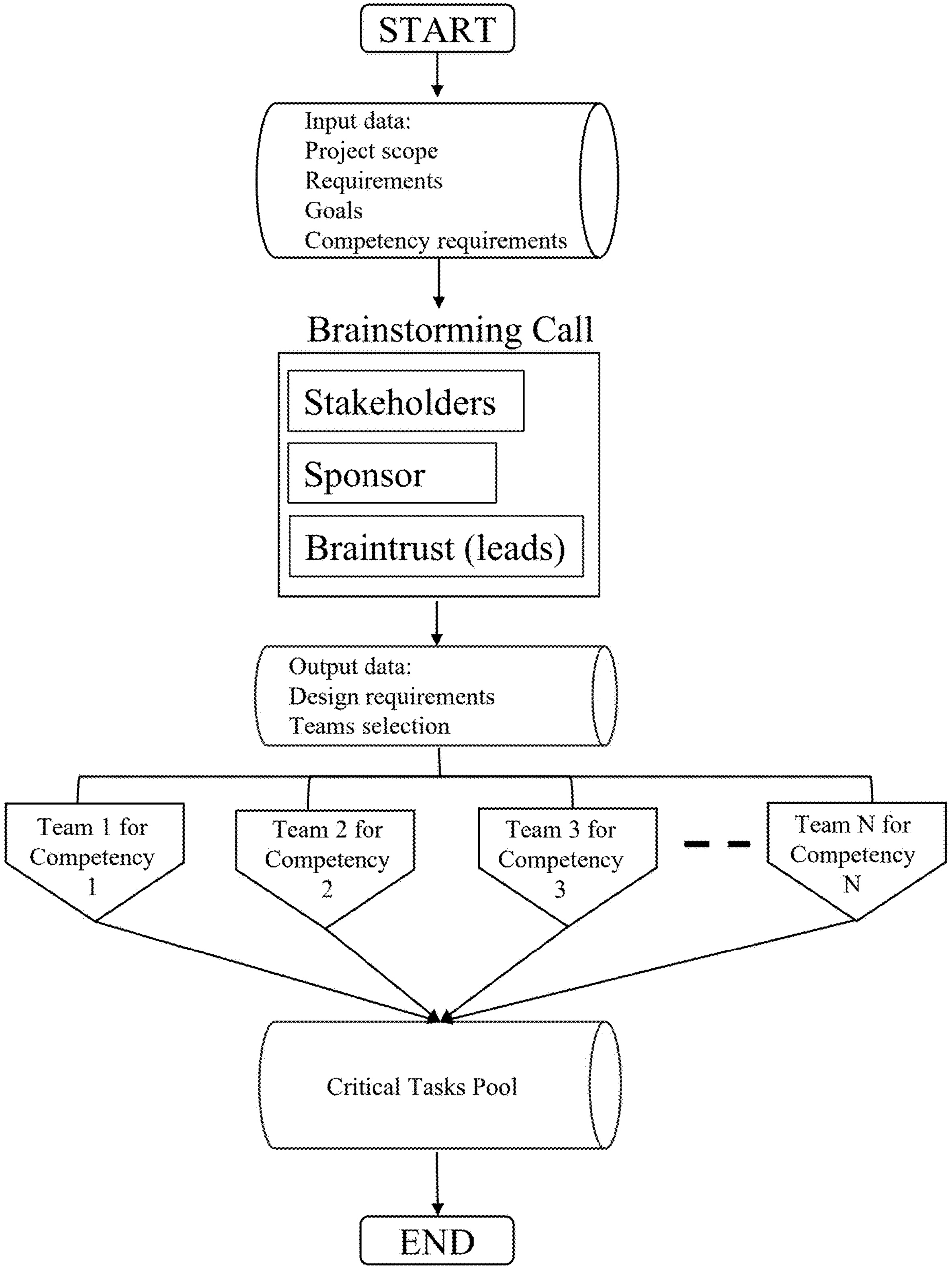
FIG. 3 is a depiction of Flowchart 1 for critical task pool generation steps, as managed by project stakeholders and implemented by module 105.
Figure 4:
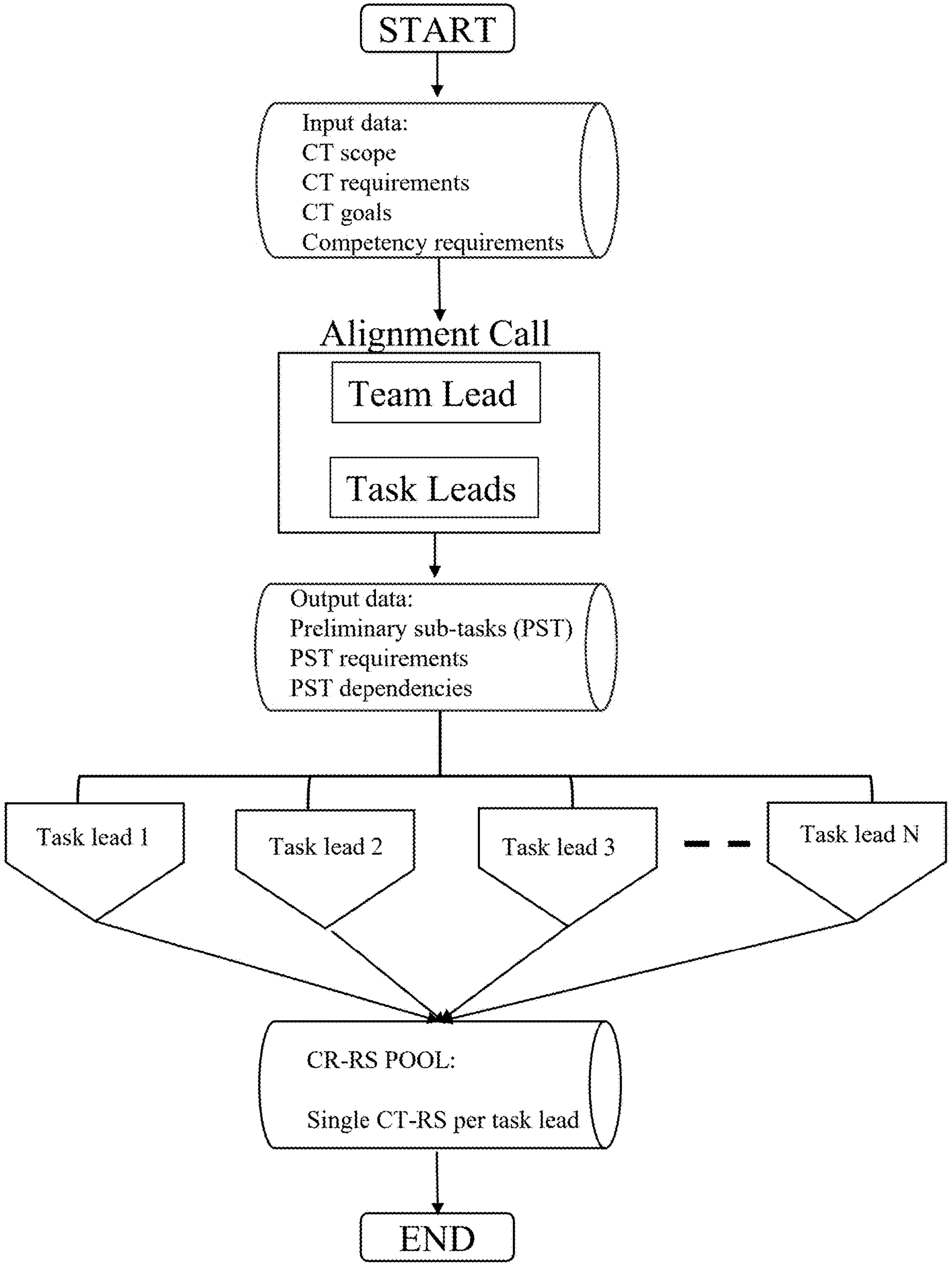
FIG. 4 is a depiction of Flowchart 2 for sub-task and CT-RS population processes, as implemented by module 105.

Module 105, which can analyze, devise, modify, and monitor defined tasks for project management, within the layers of project management (see FIG. 8), to deliver goods and services to the market in the layers, via the implementation of the following: (process A) a plurality of protocols configured for data regulation for AI use-cases; (process B) thresholds (see FIG. 2); (process C) flowchart 1 (see FIG. 3); (process D) flowchart 2 (see FIG. 4); and (process E) flowchart 3 (see FIG. 5, FIG. 6, and FIG. 7), within the blueprint, as mentioned above. Module 105 has an architecture of components (see FIG. 9) that allows the implementation of process A, process B, process C, process D, and process E.

Module 105, resides in device 101 comprising one or more processors to: (i) detect a data event related to a project associated with a project management platform, wherein the project management platform being associated with a compartmentalized liquid architecture configuration, and the compartmentalized liquid architecture configuration including a plurality of layers including: a delivery tool layer, an integration layer, a data acquisition layer, an automation layer, and an artificial intelligence (AI) layer; (ii) classify the data event based on a set of classification criteria; (iii) select a resource of a plurality of resources associated with the project management platform, based on classifying the data event, wherein the plurality of resources is being included in a particular layer of the plurality of layers; process data relating to the data event using the resource; and (iv) perform a response action based on processing the data relating to the data event using the resource, wherein the response action including at least one of: a generation of a calendar event, a recommendation for assignment of a task to a task- or team-lead, a recommendation for assignment of a task- or team-lead to a work-shift, and a generation of report for communications with Observer AI for possible escalations or realignment meetings.

External resources 111 can include individual applications providing one or more services, when connected to module 105, via network 115. An application may include one or more of a calendar application, a payment application, an electronic communication application, a social media application, restaurant-reservation application, on-demand delivery application, a project management application, a customer relationship management application, a ticketing application, a partner relationship management application, a web form application, and/or other applications providing one or more services. Due to the plurality of protocols (process A), the communication between module 105 and external resources 111 can be unidirectional, such that data is transmitted from external resources 111 to module 105 and there is no feedback from module 105 to external resources 111. Client devices 113 can be configured to communicate with other client computing platforms via server 109 and/or according to a peer-to-peer architecture and/or other architectures.

When module 105 is implementing process A, module 105 utilizes a plurality of protocols, wherein each protocol of the plurality of protocols can complement each other, to enforce data regulation for artificial intelligence (AI) use cases. The enforced data regulation, as provided by the systems and methods herein, allow the human operator to stay in control and on top of AI operations, thereby preventing AI from governing the workflow of module 105. Input into the plurality of protocols, output from the plurality of protocols, and security measures in the plurality of protocols are therefore maintained, without modification by AI. However, modification is allowed by a human, if sufficient evidence and alignments are provided, recorded, and processed by module 105. The plurality of protocols can comprise nine protocols, as described below, which are suitable for interactions that can be characterized as a handshake with artificial intelligence, leading to a constructive leverage of AI for project management.

A first protocol, of the plurality of protocols, is an honest human decision making and execution power protocol, which can be implemented and supported by module 105 of the systems and methods herein, to ensure that the human operators, at each step, are the only ones that are having execution and decision-making capacity. AI is prevented from executing any job, without human orders and decisions. Human operator honesty can be investigated through the progression of the project and by documentation for future reference and for root-cause analysis.

A second protocol, of the plurality of protocols, is a company internal data control protocol, which can be implemented and supported by module 105 of the systems and methods herein, to ensure AI in use of a company only has access to data within the company that are regulated for that specific company product, and not general and unrelated and general data, such as ChatGPT and Open AI. Therefore, the second protocol can provide external data disturbance control, which reduces the potential of AI dominating a workflow while minimizing the bias of the data in use.

A third protocol, of the plurality of protocols, is a data merge control protocol, which can be implemented and supported by module 105 of the systems and methods herein, to: (i) determine if an AI data-based merge should be actuated between two sectors of a company with different products, and (ii) the consolidation of data to be filtered based on new product needs if the AI data-base merge is actuated. More particularly, there can be data management on top of AI, by a human; and if there is a breach within a company, the third protocol enforces a blackout period on the company, which reduces access to large uncategorized data, until the AI data-based merge is regulated and reasoned out. In other words, any company or application that has access to large uncategorized data, such as Open AI, Google, or other global data bases, can pose a future threat to AI unreasonable and unprotected dominance, specifically if their database is used for automation purposes with no human supervision or confirmation and by sufficient engineering tests. The third protocol can thereby resist the unnecessary data merge in large data sets. After a forced data merge, the third protocol can help filter and categorize the data. Obviously, these companies should not possess any product automation, except for data management purposes, which can be done by regulating the data of these companies and sharing protocols. There might be other contemplated protocols that are already in place in the market, but neglect of these three initial protocols can have undesirable consequences.

A fourth protocol, of the plurality of protocols, is a data preservation and encapsulation protocol, which can be implemented and supported by module 105 of the systems and methods herein, to ensure all data generated by human-AI interaction, throughout the project, should be recorded on paper and kept as company property, while the company database and knowledge base is updated for that specific category of project or products. The reason is that after project delivery, a full reset of results and newly found data will happen on the project management platform to prepare it for the next project. The fourth protocol is thereby ensuring the program that covers the project management can never have access to the data generated by the progression of an unassociated project with different products even within the company. In case a new project is defined as continuation of a former project, only the data associated with a previously linked project, from the project data library, can be loaded to the AI programs. This protocol is basically enforcing data management and use case control on a project basis within the company.

A fifth protocol, of the plurality of protocols, is a task automation confirmation protocol, which can be implemented and supported by module 105 of the systems and methods herein, to: (i) determine if one or more tasks are given to the program for automation; and (ii) confirm if the one or more tasks given to the program for automation have been fully analyzed for failure modes. Thus, the fifth protocol can limit failure modes of AI, when there is automation of processes that can be run by AI. If failure modes risks are determined to be minor with no human or project harm (e.g., passes Asimov's laws of robotics), the one or more tasks can be automated for a pre-set amount of time for testing and final approval for a longer period of automation. This preset time is instructed, by the fifth protocol, and to be investigated within a prior FMEA (Failure Mode and Effects Analysis). This protocol minimized the risk of failure for automated tasks in current use of the software.

A sixth protocol, of the plurality of protocols, is a human focus analysis, which can be implemented and supported by module 105 of the systems and methods herein, to identify situations associated with lack of stakeholders' focus. The AI regulatory system should inspect human interaction for possibility of mistakes due to lack of focus or attention. On observation of lack of focus, the sixth protocol can: (i) suggest situations at risk of human failure and (ii) ask for refocus time for the operator. This protocol minimizes the human sources of error while completing a task.

A seventh protocol, of the plurality of protocols, is a code correction protocol, which can be implemented and supported by module 105 of the systems and methods herein, to set forth protection for correction codes on AI repetitive errors. The seventh protocol can ensure that any code that is revised, due to a bias or coding issues found within the software, should be performed by the company producing the software and not internally in companies that are using the software. This protocol minimizes the automation sources of error and malfunction while completing a task.

An eighth protocol, of the plurality of protocols, is an automation external safety analysis protocol, which can be implemented and supported by module 105 of the systems and methods herein. It defines that any step within a project that needs to be automated out of the bounds of the automation allowance of this software, that might be defined by project stakeholders, will have to pass the fifth protocol. This protocol enforces a safety net on other automated entities that are linked to the product of this invention/patent.

A ninth protocol, of the plurality of protocols, is a human imagination consideration protocol, which can be implemented and supported by module 105 of the systems and methods herein, to: (i) produce reports; and (ii) trigger root cause analysis and resolution before automations. The ninth protocol is thereby placing any human operator or project stakeholders accountable for reporting foreseeable use-case issues; within the program, human operators can create blockers or hard-stops based on their explained thought process, which will be investigated at a resolution meeting. For example, a hotline report, after a halt action on the side of the human operator or the projector stakeholders, on the automated parts of the program. The report can be externally available to the top stakeholders for root cause analysis and resolution before automation can be initiated again. This protocol reestablishes human focus on tasks while every hard-stop triggered by the operator can impact their task risk factors while using the system and methods herein.

When module 105 connects to external resources 111 and client devices 113, access to, for example, calendars, reports, and alignments from stakeholders, can be obtained, thereby updating recommendations that consider network security; defined data sharing; and alignment strategy associated with the alignments. Furthermore, the operators or stakeholders are therefore the ones that have the responsibility to use the given recommendations and decide on next options or the fate of the project, thereby module 105 supports controlled AI. Module 105 can ultimately provide automated planning for numerous tasks within the project, given the initial inputs of every project stakeholder, with the goal to keep every project stakeholder accountable in the project and as per domain of responsibility (ies). This accountability can further support the three values described previously, which are time, quality, and care, while supporting controlled AI and clarity and honesty in human decision making within the process.

The controlled AI works with human operation and requests for human thinking and decision making within the process. To provide human resistance and further control, the power is vested into a human operator to send inputs to module 105, within the steps of the systems and methods herein and to decide on next steps. Module 105 can analyze decisions and provide options for the operator, when supporting the controlled AI, by: (1) preserving sub-values (requirements); and (2) minimizing separate sources of error of human and AI operations in a joint venture and through their complimentary handshake.

For AI observation, module 105 can be used with a separate software platform in concert with module 105, to: (i) act as an AI observer and (ii) provide reports for alignments and other critical tasks throughout the project phases, via an open-loop (e.g., generating a report) or a closed-loop controlled method (e.g., task planner and roadmap updates). The AI observer inputs are solely task related and do not observe human or automated entities and or human activities, unless the task requires observation of human or automated entities and human activities (e.g., possible life endangerment in case of lack of observation). The AI observer can therefore produce documentation deemed necessary for: (i) future mass productions and (ii) preserving the rights of each workforce who accomplished their assigned tasks. A portion of these reports, as produced by module 105 working in concert with the separate software platform, can generate a draft on workforce promotions, thereby: (i) providing career progression avenues within the company upon project success; and (ii) also considering the task deliverables and the fashion that the task deliverables are delivered by the task assignee. Functional capacity, input, and outputs are discussed below.

With respect to module 105 minimizing errors of humans and the AI: careful and focused human workers are mostly prone to unrepeatable errors, while AI is mostly prone to repeatable errors. The goal of this series of module 105 of the systems and methods herein is to minimize both errors by collaborative work of AI and human stakeholders, wherein the human stakeholders find the repeatable AI errors and create a hotline report for future fixes. Lack of sufficiency in detecting the AI repeatable error leans back to operators' knowledge and proof-reading and proficiency at work and their responsibilities. The unrepeatable error by human is due to lack of focus, care, or knowledge at the time of operation, while AI repeatable error is due to AI processing bias sourcing from: (i) lack of sufficient input data and/or biased data generation sources; and software and program qualities in calculation and deliveries. Module 105 can be use-case tool that: (i) preserves human operators time to think and focus on decisions of the human operators; and (ii) focuses on tasks at hand with the goal for a project deliverable that preserve reliable and quality factors defined at an earlier stage in the project, by sending warnings and suggesting solution to remedy the lack of focus.

With respect to module 105 collaborative connection with observer AI, goal is to preserve a list of sub-values, and for that, a set of rules are enforced for: truth seeking in operations, momentum and efficiency in deliveries, project deliveries fulfillment given the evaluated project budgets, and documentation for future care, which can be sustained, again, in a collaborative Human-AI interaction. The set of rules include: (a) promoting human superiority and its preservation; (b) promoting AI processing of prompted inputs; (c) using AI assistantship; (d) providing facts, based on project progression and activities and stakeholder inputs and choices; and (e) providing details on the projects with the possibility to redefine the project path at any given time and by the approval of project top stakeholders.

With respect to (a) of the set of rules, human superiority can be preserved and enforced in critical steps of task definitions and decision-making process with a handshake of module 105 and observer AI. This process will furthermore challenge the decision-maker by means of qualifier questions to activate their thought process and set it on top of the project stakes. On the other hand, human can challenge the AI options by asking for more valid options to choose from, if applicable. Applicability of the newly suggested option has to be inspected against the project requirements and by the AI.

With respect to (b) of the set of rules, AI use case in module 105, can process the prompted inputs from human operators and results of human operators' decisions to update its process and predictions on the faith of the project and provide visibility to stakeholders. This is a complimentary to item (a).

With respect to (c) of the set rules, AI assistantship using module 105, can be used only for data processing, documentation, process planning, predictions, and companionship to human stakeholders with the goal to remove non-value-added activities within each and every step of a project in process.

With respect to (d) of the set of rules, program 105 along with observer AI, can: (i) provide facts based on process activities and stakeholder inputs (i.e., program 105 analyzing facts), wherein the facts are results of initial inputs of the project stakeholders and their decisions and activities through the processes and events; and (ii) provide visibility on the outline of the project throughout the process.

With respect to (e) of the set of rules, program 105 can provide details and numbers on current status of the project, while never enforcing option selections to operators, by means of verbal consultations and not providing option elimination or improvement, by virtue of each project having its own bounds and limits, as defined by "Human" stakeholders. The final selection of each decision point solely relies on the project stakeholders. For top project decision branches, if the options are not desirable or agreeable, the project stakeholders have the freedom of revising the task outputs (with an addendum to requirements as an impact) to reach better options for finalization of the decision-making process.

Module 105 of the systems and methods herein aids in the timely project deliveries, which are paramount for the success and sustainability of any business, across all industries, by implementing a blueprint for: risk mitigation, task definition, AI observation, and dynamic queue processing. In project management, as aided by module 105, a pivotal phase involving a comprehensive elucidation of critical steps, can therefore be meticulously outlined, and visually depicted through a plurality of processes of the systems and methods herein. A systematic approach, as applied by module 105, can define key steps before any development activity on project deliverables. Steps such as project task definition, categorization, assignment, risk, and mitigation planning. The blueprint for project tasks can be created, to serve as a guiding framework for project leaders and stakeholders, wherein the guiding framework is facilitating the definition and categorization of tasks, while systematically assessing associated risks. Employing a detailed process flowchart, each block is accompanied by a thorough description, mitigating the risk of procedural failure, and ensuring a methodical progression through the project's intricacies.

The blueprint, as implemented by module 105, is crafted with the primary objective of delineating a structured approach to define and investigate various tasks deemed necessary for the successful completion of a project, ensuring the fulfillment of specified requirements through the delivery of tangible outcomes while satisfying the defined requirements and project time and finance budgets. The systematic framework outlined in FIG. 2-10, which encompasses steps comprising: task compilation process, task analysis, mitigations, and possible room for negotiation for deliveries and requirements, wherein each of these steps is intricately devised, by module 105, thereby contributing to a comprehensive understanding and strategic planning of the project's tasks combined by its feasibility analysis. The task collection process involves identifying and collecting all pertinent tasks and setting the foundation for subsequent task analysis, wherein the task analysis delves into a detailed examination of each identified task, thereby unraveling complexities and requirements, which are not readily apparent. Mitigations are strategically integrated, by module 105 and AI observer handshake, to address potential risks and challenges associated with each task, fostering a proactive approach to risk management, in the context of project management for delivering goods and services. Module 105 is configured to process or acknowledge the criticality of risk management, task definition, AI observation, and queue processing, as described in the sequel.

For risk mitigation of the blueprint implemented by module 105, module 105 acknowledges a critical phase in project management lies in the meticulous definition and analysis of tasks before any development activities commence. This involves creating a clear roadmap, aligning tasks with project goals, and establishing a well-organized queue of activities. For example, in a manufacturing project, defining tasks such as raw material procurement, production scheduling, and quality control before starting the production process is essential to ensure efficiency and on-time delivery.

For task definition of the blueprint implemented by module 105, module 105 acknowledges that task definition is only one facet of a broader project management process, and module 105 is designed with a specific focus on this pivotal step. Other precursor steps, such as project need analysis, concept exploration, and requirement derivation, precede the detailed task definition, assignment and feasibility analysis that are outlined in this blueprint. While these preliminary steps are extensively discussed in various systems engineering literature with precision, it is noteworthy that minor refinement points may be introduced in other related but separate patents in continuation of this work. Module 105 deliberately omits the exhaustive coverage of the preceding steps, as disclosed in the engineering literature, aiming to concentrate on the intricate details associated with task definition, thereby: (i) continuously improving and enhancing future blueprints, by incorporating any minor adjustments gleaned from ongoing project management experiences and advancements in the field; and (ii) ensuring the evolution of a comprehensive and agile framework for effective project execution.

For queue processing, module 105 acknowledges the queuing process ensures a methodical arrangement of tasks, thereby optimizing efficiency and resource utilization. These steps as aspects, which provide a comprehensive guide for project teams aiming for precision and success in task definition and planning, are described below.

The blueprint, as implemented by module 105, can be used to construct and complete a natural project flow process, as envisioned and depicted in FIG. 10 (FIG. 10 depicts Process Architecture 1, which is the Project Tree). The tree depicts a general vision of project scoping from requirements analysis to development process and prototyping finalization for production preparation, which can be achieved by project management enhancement functions of the blueprint.

As a first project management enhancement function of the blueprint, module 105 can connect to GUI 103, for the operator to run a general platform, with multiple layers, that provide the communication channels with the workforce. GUI 103 can be used to gather the data in a user-friendly format, which is then received by module 105. A data repository, such as database 107, can be used to store the data over the course of the project. Artificial Intelligence, as used in module 105, can: (i) search and pre-process data for use throughout the project; (ii) communicate with the main GUI (GUI 103) for data representation and report generation; and (iii) communicate directly with every project member to provide information and/or progress reports. In FIG. 8, the layers within project management for the delivery of goods and services, as manifested in the computing environment of FIG. 1, are depicted, wherein module 105 can be a project manager platform that has: (i) a front-end, (ii) a mid-end, and (iii) a back-end. GUI 103 can be at the front-end, which connects to mid-end and back-end to capture data and release information from the process flow. Additionally, the front-end can further include the following as, for example, sub-layers: a project planning and feasibility interface; internal network connection; social network manager; workforce ranking; and human-AI interface. On the back-end of module 105, there are multiple layers in connection with the artificial intelligence. The top layers on the back-end are data integration, front-end-level data access and data security manager, data post-processing, data reporting, while mid-end is mostly taking care of communications systems. The mid-end can include: (i) a project flow manager, with the following sub-layers of/for: timing and planning, dynamic prioritization, delivery estimates, dynamic risk analysis/report, project structure manager, meeting and reminder planner, AI observer, and Human-AI interface; and (ii) task manager, with the following sub-layers of/for: task pools, task assignments, task budgeting, task progress reports/documentations, and Human-AI interface. Data integration has sub layers of/for data storage management, data pre-processing, data classification, back-end-level data access and security manager, and artificial intelligence communications.

As a second project management enhancement function of the blueprint, module 105 can connect to the separate software platform used as AI observer, and enforce a policy that AI observer can: (i) have full capacity accessibility only on tasks' inputs and outputs and other task related details; and NOT have capacity accessibility of the workforce, whether as an automated entity (robot) or a human, again, unless the task requires AI to observe the workforce (e.g., hospitals and other life care scenarios). The goal of AI Observer, as instructed by module 105, is to: (i) draft honest reports on tasks status, which are the product of the project tree (see FIG. 10); (ii) provide feedback signal to: (a) project task planning and (b) progress scheduling, during project development; and (iii) provide reports to project stakeholders for their visibility on tasks schedule and progress. As depicted in the project tree, there is a visibility boundary of the AI Observer, wherein the AI observer is communicating with module 105 to create reports on the progress of tasks.

An AI observer, which connects to module 105, can function based upon: (1) observer input protocols; (2) observer output protocols; and (3) observer security protocols, thereby protecting the project process from failure, considering inputs. Note that all items below are dynamic, meaning any change on input protocols below, can be reported back to the observer to update the outputs and functional protocols, in real-time. Mathematical relations and formulations, as processed and used by module 105, can link the operations of the AI observer to other different project maintenance functions.

Module 105, when working in concert with the AI observer, can enforce (1) observer input protocols comprising: (a) project requirements and KPIs (Key Performance Indices); (b) each and every task timeline, task budget, task input, and task output; wherein: each task input is defined by addressing "what and why" is needed for the task to get started, each task output is defined by addressing "what" is needed for the task to be marked as completed; (c) KPIs of tasks, as derived from the project KPIs, which can include acceptable qualification metrics/measures; (d) prioritization and hierarchy of tasks, which can be task prioritization that might be different than a hierarchy or order-to-complete due to several scheduling reasons; (e) features related to tasks that include: attendees level for final testing and approval; (f) representatives of tasks and their corresponding leads ordered in their rank for the project (team-lead, group lead, stakeholder); (g) project stakeholder communications; and (h) a project calendar.

Module 105, when working in concert with the AI observer, can enforce (2) observer output protocols comprising: (a) documentations on necessary and sufficient tests and reports on each input of a task and output concerning the deliverables quality; (b) completion performance score on each task; (c) escalations/reports/warning on possible tasks development process failures; (d) handshake with prioritization system; (e) access to hierarchical emailing system; and (f) Questionnaires to stakeholders.

Module 105, when working in concert with the AI observer, can enforce (3) Observer Security protocols comprising: (a) all automated processes are precluded from human interventions, thereby protecting the Observer's honesty level at 100%; and (b) connection to security breach report hotline.

As a third project management enhancement function of the blueprint, module 105 can implement and reduce to practice project management delivery, which accords with flowchart 1-3 for a single project task planning (see FIG. 3-7). In case of multi-project task planning with the same team or a combination of the team members with other teams, module 105 may need some moderate level of adjustment.

In FIG. 5, FIG. 6, and FIG. 7, flowchart 3 (Project Task Assignment and Feasibility Studies) illustrates this systematic process to identify and emphasize points for more clarity and process clarification. Flowchart 3 includes step 1, step 2, step 3, step 4, step 5, step 6, step 7, step 8, and step 9, wherein steps 1-3 are in FIG. 5; step 4-6 are in FIG. 6; and steps 7-9 are in FIG. 7, wherein FIG. 6 is a continuation of FIG. 5 and FIG. 7 is a continuation of FIG. 6, as also indicated in braces ({ }).

The blueprint is therefore applied by module 105 to compile tasks, extract sub-tasks, analyze tasks and subtasks, identify mitigation, and can interact with one or more human operators (top stakeholders, sponsor, team-leads, and task-leads) and artificial intelligence techniques. Enclosed in brackets ([ ]), module 105 is interacting with the following entities for project management: (i) top stakeholders; (ii) sponsor and team-leads); (iii) team-lead and AI; (iv) task-lead and AI; (v) task-lead; and (vi) AI.

Step 1 involves project requirement delivery, in which module 105 approaches step 1 with a top to bottom alignment strategy. Project requirements delivery comprises: (a) project deadline and finance thresholds; (b) project specific and output requirements; (c) project severity; and (d) task feasibility and compilation deadline. It is noted that the requirement analysis and all the variables will have a meaning after the initial project "Needs and Requirement Analysis" and before this step. Since the Needs and requirements analysis will be a large document, it is decided to keep it out of the scope of this document.

Figure 2:
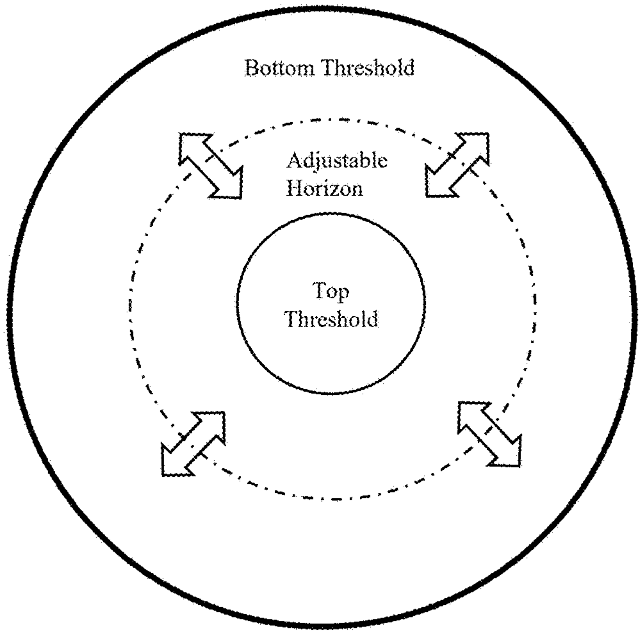
FIG. 2 is a depiction of project budgets thresholds, as managed by project stakeholders and analyzed by module 105.

With respect to (a) and (b), as pertaining to project deadline and finance thresholds in step 1, there can be three thresholds (TOP, MIDDLE, and BOTTOM) for each time and finance budgets. TOP thresholds can be the most desired and optimal ones. MIDDLE thresholds can be in cases of critical tasks moving onto their mitigation sub steps with higher time and/or financial requirements and it is a floating indicator. Project stakeholders can decide for fixed and ultimate BOTTOM thresholds, for time and budget boundary, of the project before any feasibility study on the project. However, having both of the time and budget BOTTOM boundaries floating can lead to major future delivery delays or miss-alignments. Therefore, module 105 recommends keeping time or budget, as one of the absolute fixed boundaries after definition and approval, open for discussion after delivery of feasibility and task assignment for the project deliveries. The most optimal process recommends fixing the "time horizon" BOTTOM bound while keeping a silent open BOTTOM boundary for project finances for future negotiations. These thresholds can initially be addressed in Project Mapping and Project Needs and Requirements Analysis steps prior to step 1 here. While through the steps reported in the sequel, these thresholds will form a more reliable value. On rare and special occasions and if all stakeholders and customers agree and records are documented, the BOTTOM time horizon/boundary can open up to adjust project delivery deadline(s). BOTTOM thresholds are defining redlines of project budget limits and are used to assume or assess delivery failure possibilities before investing major development capital. The project failure possibility causes can be identified and correlated with specific tasks by module 105 before the development starts and dynamically updated while the project is in development phase. In FIG. 2, project budget thresholds, as managed and analyzed by module 105, are depicted. Project time and finance MIDDLE bounds will start floating as soon as AI has an estimation of budget passing the TOP (best) thresholds, which is highly probable in almost all complex project cases. Top thresholds are simply defined through best case scenario analysis for each project branch and are required to have a measure of best-case scenarios for future reference and for a measure on accuracy of project team and AI calculation and delivery accuracy. Reliable and active project teams have shown a narrow gap between TOP and BOTTOM thresholds with reasonable derivative values for MIDDLE threshold rate of change, while the project is in development phase.

With respect to (b) project requirements in step 1, project requirements derivation can be defined in prior steps to task planning and is out of the scope of this patent. On the other hand, requirements delivery is a critical input to task collection and further analysis. The latter is the main focus here. Project requirements must prominently cover the project output quality based on customer demands.

With respect to (c) project severity in step 1, which is presented by project sponsor and can be defined by: (i) allowable maximum risk and (ii) probability of failure mode. The maximum allowable risk a task can take, which can be referred to as the "Maximum Acceptable Risk Level (MARL). Tasks with calculated risk higher than MARL can be recorded for future reference but must be mitigated or, in rare cases, can be eliminated from considered tasks in active project tasks. If these tasks are labeled as critical, then a sub-task for that critical task must be the cause. Failure mode analysis, in these cases, are useful to find and allocate mitigation steps to reduce the risks lower than the MARL threshold. For hypothesis testing of Probability of Failure Modes (POFM) of a high-risk sub-task, project leads and program directors must define an Acceptable/Allowable Probability of Failure (APOF). APOF can determine if a failure mode constitutes a possibility to negatively impact a project subtask planning and resources. In case of POFM>APOF, the Null Hypothesis (POFM≤APOF) is rejected. For each Hypothesis testing a general "Significance Level" (a) and "Power of the Test" (B) must be defined as well, before feasibility study can start throughout the next steps.

With respect to (d) project task planning timeline in step 1, Establishing a well-defined timeline for task planning is imperative for every project, serving as a framework to enforce the meticulous creation and compilation of tasks. The timeline's intricacies are contingent upon the project's complexity, encompassing critical tasks and their respective sub-tasks. Following the initiation of an initial task planning timeline, adjustments may become necessary post-completion of step 5, as all tasks are defined, and risks are observed. It is crucial to emphasize that the enforcement of both the timeline and project budget remains paramount at the highest level of stakeholders. This is imperative because, in the event of the identification of multiple high-risk tasks and considering the severity of the project, a dissolution phase may be initiated-a decision solely within the purview of the top-level project stakeholders. This approach ensures a proactive management stance, aligning project planning with strategic objectives and enabling timely interventions to address unforeseen challenges.

Project "initial" KPIs can be the product of automatic derivation of module 105, with its approved database that was built and formed previously and can be delivered at this step. It is noted that KPIs are bound to minor changes at step 8 and as the project program proceeds with tasks assignment and feasibility studies.

In the systems and methods described herein, for step 1, module 105 can perform the following project management related actions, by executing instructions to: (i) receive and recommend inputs as structured and unstructured data forms for project requirements and budgets (time, finances, risks); (ii) connect to internal and approved databases by project stakeholders to construct recommendations for finances and deadlines, requirements and a timeline for task planning and feasibility study-note that the internal database must be highly biased to initial database gathered during previous requirement and needs analysis (iii) record and document all inputs from (i) and (ii) to be presented and carefully approved by stakeholders; (iv) determine seed values for milestones (these values are only backed by previous research and are bound to adjustment at step 8 of feasibility and assignment rhythm), such as the project timebound and finance bounds, which have three knubs comprising (a) minimum threshold, (b) maximum threshold, and (c) middle floating threshold to be adjust dynamically through the project progression, which reports out the projected outcome for stakeholders' visibility and prediction purposes; (v) arrange review meeting and acquire sign off on all specific and output project requirements for delivery at the step 1; (vi) review and signoff on project KPIs; and (vii) create briefings of all key topics and numbers from items (i)-(vi), for future reference.

Step 2 involves task compilation, in which module 105 approaches step 2 with a top to bottom then bottom to top alignment strategy. Task compilation, as depicted by flowchart 1 and flowchart 2, can be performed in a general staff meeting including all stakeholders in the form of a brainstorming session to capture main task elements of the project. Considering the project scope, goals, and requirements, engineering and systems team-leads can present the critical tasks (CT) required for project completion.

With respect to task compilation in step 2, Flowchart 1 (CT Pool Generation Steps in FIG. 3) depicts the steps for the critical task generation process. Each CT is a large chunk of tasks for a team with the same expertise (e.g., mechanical engineering, electrical engineering, and software engineering) with a defined input and output. After CTs are gathered, discussed, and approved with the leadership team, all predefined task-leads under each team must independently start adding sub-tasks to each CT via a Report Sheet (CT-RS) containing each sub-task title and a brief description on each sub-task based on their understanding and experience level.

With respect to task compilation in step 2, Flowchart 2 (Sub-task and CT-RS Population Process in FIG. 4) depicts the process for a general recommended approach for CT-RS preparation. Task-leads can deliver their CT-RS to their team-leads to prepare for task compilation procedure. At this point, all project major and minor tasks are gathered with no specific order, priority, risk, and timing. Note that task compilation by task-leads can include every task item that the task-leads can help to derive the CT deliverables and requirements. This process can create multiple reports for each unique CT from task-leads. Module 105 can collect all CT-RS reports and refine and remove the duplicate tasks to populate the total number of tasks per CT. All the unique tasks should have a placeholder and no unique task should be eliminated through this process unless proven and documented to be totally unrelated to CT. This document is called Combined CT-RS (CCT-RS). Each CCT-RS can report the "total number of sub-tasks" (II).

In the systems and methods described herein, module 105 can perform the following project management related actions, in step 2, by executing instructions to: (i) create automatic cycle of operation and run the cycle through the stakeholders for approval and confirmations and additional feedback; (ii) recommend critical tasks (CT) and subtasks for each CT, referring on project internal database, with the open possibility to add or remove task items for each category by any stakeholder; (iii) automatically cycle through team-leads for CT confirmations and creates CT-RS; (iv) automatically cycle through task-leads for subtask gathering from task-leads, to yield an update its database; (v) update CT-RS and deliver to team-leads for reviews and approvals; and (vi) create CCT-RS with a handshake with each team's task-leads through an automated, recursive sorting arrangement and report to top stakeholders and team-leads for final approval on the last part of step 2. At the end of this step, module 105 can create a thorough report for each CT assorted and approved subtasks and a top-level report will be generated and sent to top stakeholders along with the CCT-RS.

Step 3 involves time analysis and sub-task assignment, in which module 105 approaches step 3 with a bottom to top then top to bottom alignment strategy. The CCT-RS generated in Tasks Compilation Level can gather timing per sub-task per task-lead. The purpose of time analysis is to: (i) assign and report a timing measure for each sub-task and (ii) illustrate if all sub-tasks are defined with a reasonable timing size. That is, CCT-RS can be released back to task-leads separately for filling their names and the required completion time of sub-task (@_ij), where i is the subtask number and j is the task-lead number in the report sheet. The CCT-RS can now have multiple reported completion times per sub-task per task-lead, while only team-lead and top stakeholders have visibility to this information. The task-lead and team-leads and other stakeholders must be notified that the time that they report for their assigned task(s) has impacts on their performance analysis and cumulative rewards being assigned to them and it will show its impact when the project delivery is fully matured but it is visible to them at any time. The updated CCT-RS, at this point, may need a recursive inspection for task timing resizing and reshaping. Note that steps 2 and 3 can be run concurrently although it has been proven that separating them has benefits to input accuracy at each step.

For the recursive and task timing inspection, team-leads can gather the updated CCT-RS with $\varphi\_ij$ for each task and find the median of the reported required time per sub-task. Here, a total median CT completion time can be calculated ($\Phi$). A sub-task timing control value can be calculated here which is $\tau=\Phi/II$ concerning the values calculated under each CT. While this calculation can be processed in the back-end, the team-leads can suggest and adjust φ_ij due to unforeseen and necessary reasons that have to be reported and recorded. This added time can be considered as a buffer time. It has been proven that high risk tasks need higher buffer times to manage their risk levels. At this point, since the tasks do not have associated risks, buffer times can also be set automatically to add another 20% to t and to be firmly adjusted after risk and mitigation analysis steps.

After receiving the updated CCT-RS, if φ_ij>1.5*τ, then the task-lead j for sub-task i can be eliminated from the CCT-RS. This process can eliminate the lower performing task-leads for that specific sub-task, which can be referred to as low-performing outlier removal, based on outlier elimination statistics. If this recursive process leads to only one task-lead for a sub-task, the best two lower performing outliers must be added for timing re-evaluation and recalculation to be included as reserved task-leads for that sub-task. At the end of this recursive process, each sub-task i must have at least three reserved task-leads j1, j2, j3 and charted in order of their corresponding φ_ij. In case of lack of three reserved task-leads per task, top stakeholders can be placed as reserves, elimination and requests for backup and reserved task-leads can all be managed automatically through the front end or the GUI that can be used for the assignment process. Parts of this step can be automated for process simplicity and time efficiency, as instructed by module 105, which works in concert with the AI observer.

In the systems and methods described herein, module 105 can perform the following project management related actions, in step 3: compile and process activities associated with CCT-RS forming and the report sheets that can be delivered to top stakeholders and team-leads for approval (i.e., analyze contents of CCT-RS). The human operator of module 105, in step 3, can be all project stakeholders, wherein the project stakeholder can: approve and review of CCT-RS before processing general reports by module 105.

Step 4 involves dependency analysis for sub-tasks, in which module 105 approaches step 4 with a user-friendly graphical user interface (e.g., GUI 103) for task dependency analysis. The communication strategy can be confined between team-leads and task-leads assigned under each CT. Step 4 is independent of Step 3 and can be covered right after or during sub-task timing analysis and assignment. It has been proven that separating and running step 4 from previous steps can benefit process accuracy due to bias minimization. team-leads can investigate all tasks and assign dependencies of each sub-task with following labels, independent or interdependent. Stated another way, without priority considerations, sub-tasks under each CT are either related or unrelated to one another. Module 105, at this point, can create clusters of sub-tasks that are interdependent. This process can create multiple independent clusters. Each cluster's output is independent from others while the sub-tasks under one cluster have dependencies and can be considered and discussed further in the dynamic prioritization blueprint. A majority of the processes/parts of this step can be managed by the GUI on the front-end, while expecting, or receiving, inputs from task-leads and team-leads. It is important to note that CTs with over 3 independent clusters are considered to be complex CTs and module 105 will recommend creating new CTs as the independent clusters increase in numbers under each CT.

In the systems and methods described herein, module 105 can perform the following project management related actions, in step 4, by executing instruction to: create user friendly interface(s) for task dependency and interdependency analysis; and create clusters and report after team-leads completed their part of work and ask for signoff from top stakeholders. The human operator of module 105, in step 4, can be team-leads, wherein the team-leads can define or correct dependency and interdependency of the tasks within the GUI (e.g., GUI 103). Note that any adjustment to the output of the GUI should be reasoned, recorded, and reported to top levels. A final version of all CTs with their corresponding subtasks and their clusters and timings will be reported and updated in CCT-RS at the end of this step.

Step 5 involves risk analysis for sub-tasks, clusters, and critical tasks, in which module 105 approaches step 5 with team-lead and task-lead levels with a bottom to top strategy. The risk level for each sub-task can be reported in CCT-RS per existing task-lead. Risk level can be calculated via well-known formulas defined for task specific risk calculation. Examples are, Failure Mode and Effect Analysis (FMEA) or Quantitative Risk Assessment (QRA). For task-leads, a Multifactorial Falls Risk Assessment (MFRA) is necessary, that can gauge task requirements against task-lead capabilities. Note that the task specific experience level of the task-lead has a considerable impact on the total risk calculation of the sub-task completion and quality. Hence, module 105 deems the calculation of the Overall Combined Risk (OCR), by encapsulating both the independent risks arising from the task-lead and the inherent risk of the task, as a critical measure for project management. That is, at this point, each CT has multiple sub-tasks in up to 3 clusters, and each sub-task has multiple measures of risk and timing reports in CCT-RS each measuring the capacity of the previously reserved task-leads and the sub-task severity. Now, module 105 can calculate the total cluster risk level due to interdependency of clustered sub-tasks. The final process at this step is to calculate the combined risk for the CT delivery. While there are multiple methods to calculate total risk of independently grouped tasks, a simple estimation can be offered by considering the cluster with highest combined calculated risk as CT risk to delivery. The choice of risk calculation methods will be defined by top stakeholders within the project.

In the systems and methods described herein, module 105 can perform the following project management related actions, in step 5, by executing instructions to: (i) prompt the top stakeholders for method of risk calculation on CTs (ii) prompt the bottom stakeholders for an estimation of risk for each of their tasks; (iii) insert the independent risk of tasks leads and add to the task related risk (iv) calculates and delivers the risks based on user inputs and its database within the company (v) calculate and update the clusters and CT risks; and (vi) creates reports and ask for review and signoff.

Step 6 involves hypothesis testing for high-risk sub-tasks (borderline cases are OCR≈MARL), in which module 105 approaches step 6 with task-lead level strategy. Each task-lead can be made aware of the MARL as a project requirement, by module 105. In the case of existence of high-risk sub-tasks, task-leads, with the help of module 105 and a GUI (e.g., GUI 103), should create fishbones to identify the failure modes and calculate the probability of failure. If the failure mode has a population data to sample from, a confidence interval estimation to assess the probability of failure can be deemed necessary, which can be guided by module 105. Hypothesis testing can also be recommended for instances where case confidence interval estimation is not possible, thereby defining how serious the failure modes are. In case of rejection of the Null Hypothesis ($H_o$), where a rejection is enforced with $H_o$ that can be defined as POFM being lower or equal than APOF or discovering a wide confidence interval, sub-task mitigation planning must take place. Most of the process at this step can be performed through an automated guidance of module 105 via a user-friendly GUI (e.g., GUI 103).

In the systems and methods described herein, module 105 can perform the following project management related actions, in step 6, by executing instructions to: (i) establish and enforce a process to gather and evaluate task risks (ii) perform all risk calculations based on user inputs described in previous paragraph, (iii) report high risk CTs and their subtasks and their failure modes; (iv) provide and guide through running FMEA or other selected quality inspection methods defined by the user to run hypothesis testing or other statistical tests to confirm and characterize the risky tasks; and (v) create reports and ask for review and signoff. The human operator of module 105, in step 6, can be a project team, wherein the project team can: define test methods; define and add other failure modes and signoff on the possible recommended failure modes that are reported by module 105; and review the reports and ask for corrections if needed; and sign off on each report. Note that all test methods and formula selections must be selected and recorded with a reasoning. A list of all methods for each task will be reported on a separate sheet with the reported reasoning for signoff to top stakeholders.

Step 7 involves sub-task mitigation planning, in which module 105 approaches step 7 with a bottom to top strategy. Rejection of the Null hypothesis or ending up with a wide confidence interval can be used by module 105 as a measure to enforce the necessary conditions for mitigation planning requirements. Mitigation planning requirements can comprise: (a) mitigation of sub-tasks with high failure mode; (b) time re-allocation; (c) risk recalculation; and (d) gathering of mitigation for sub-tasks with high risk of failure.

With respect to (a), there can be a meeting to gather and brainstorm on new approaches to mitigate the sub-tasks with possible failure mode. The outcome of the meeting must present up to but not limited to three reserved mitigating remedies for each identified high risk sub-task. It must be noted that while AI can assist in providing recommendations for mitigating steps, it will be human stakeholders' task to define and correctly characterize the newly mitigating tasks.

With respect to (b) time allocation in step 7, the time allocation for the mitigating sub-tasks can be the same as in steps 3-4, which will be circulated automatically by module 105 to acquire necessary task-lead and team-lead inputs, as soon as the mitigation task is defined and recorded.

With respect to (c) risk calculation in step 7, the risk calculation for the mitigating sub-tasks can be the same as in steps 5-6, which will be circulated automatically by module 105 to acquire necessary task-lead and team-lead inputs, as soon as the mitigation task is defined and recorded.

With respect to (d) gathering of mitigation of sub-tasks in step 7, the mitigating sub-tasks can all be gathered in a reserved action block under the original sub-task and with a choice of prioritization method. This can provide visibility to select mitigation sub-tasks when the engineering development is in process. At a point when a mitigating solution (Mitigating Task-MT) is found for high-risk sub-tasks, the MTs can be substituted with corresponding high risk sub-tasks. Note that, the original sub-tasks that have a plausible MT can be placed as a reserve for those MTs (these MTs can be considered as the sub-tasks) for future investigations or possible utilization in this or other similar project processes.

In the systems and methods described herein, module 105 can perform the following project management related actions, at step 7, by executing instructions to: (i) initiate processes for mitigation planning for each defined item in step 5; (ii) recommend for mitigation steps and ask for other inputs and run the same process for each mitigation task from step 2 to 6 through the cycle explained previously, (iii) update project timelines, delivery status and create reports and compare against defied thresholds and requirements. The human operator of module 105, in step 7, can be any member of project team or project stakeholders, wherein they can approve, redefine mitigation steps, provide necessary input for all operator inputs needed from respective users that are defined in step 2 to 6 and this time for mitigation tasks and finally review and sign off their elections and adjustments.

Step 8 involves final requirements inspection, in which module 105 approaches step 8 with a bottom to top alignment strategy and requires a final decision for sign-off, negotiation, or dissolution, as a top-level strategy. Considering worst-case and best-case scenarios, module 105 can create reports with the goal to challenge the project finance and timing expectations and deliveries' outputs against requirements that are defined at step 1. This can be a one-time and final requirements inspection meeting with possible updates to requirements, tasks and their outputs with all project stakeholders. It is noted that the observer AI along with module 105 will be updated of all the inputs and challenge the changes against the final product requirements and other project budgets. The meeting agenda can be Item A, Item B, Item C, Item D, and Item E. Item A is a CT timing and statistics report with worst-case and best-case scenarios discussion; challenging project timeline thresholds with a causality analysis. Item B is a CT finance and statistics report with worst-case and best-case scenarios discussion; challenging project finance thresholds with a causality analysis. Item C is a CT risk and statistic report with worst-case and best-case scenarios discussion; challenging project severity with causality analysis. Item D is a negotiation for possible design changes and design requirement updates, specifically in case even a single item in step 5 is surpassing the project severity without mitigating plan or multiple task items causing the project possibly crossing the BOTTOM deadlines, and/or finance thresholds. Item E is the final requirements inspection against CT deliveries combined with a signoff for project deployment or a possible dissolution. Items A, B, and C can be generated using automatic report generation for consideration later sub-steps, wherein Items A, B, and C can use sub-task and critical tasks and their clustered dependencies to calculate series of time, finance, and risk budgets for best-, even middle-ground-, and worst-case scenarios using the following criterions, wherein: (a) project path hits no mitigation or delays in the best-case scenario; (b) top 20% high risk tasks consume 80% of best-case scenario time and budget, and the rest of the tasks complete on time and budget, as the middle-ground scenario; and (c) each of the following events may occur in the worst-case scenario, wherein: (c.1) a project path hitting all expensive mitigating tasks with respect to time and finances, (c.2). a project path hitting low performer task-lead substitutes due to availability reasons, (c.3). task delivery hitting unforeseen delays due to uncertain risks associated with task-lead or the task itself, and (c.4). tasks buffer time hitting complete exhaustion, and finally (c.5). combined CT outputs do not cover the defined requirements in step 1.

In the systems and methods described herein, module 105 can perform the following project management related actions, in step 8, by executing instructions to: create reports that can include Items A-E; ask or request for sign off or recommend for design reviews and concept review meetings; get or receive final sign off to kick-off project development step from top stakeholders; and document and record results. The human operator of module 105, in step 8, can be project top stakeholders, wherein module 105 can: finalize and acquire signoff for project development kick-off from project top stakeholders.

Step 9 involves final team realignment, in which there is a top to bottom alignment strategy. In case of any change control management from step 8 on any CT, the team is required to revisit the previous steps for possible adjustments to sub-tasks under those revised CTs and their timing and risk calculation steps. The tasks and possible task owners with statistics analysis and reports for each task within the project can be created and recorded. Risk mitigation planning is also in place, in case the high-risk sub-tasks are not risk alleviated during the project development, the process can move onto mitigating newly devised tasks instead of original tasks. The process provides necessary and sufficient ingredients for dynamic prioritization due to any possible and unexpected project parameter changes during the development phase.

In the systems and methods described herein, module 105 can perform the following project management related actions, for step 9. By executing instructions to: (i) hold and report the meeting records; (ii) assign concept, design, and final review owners for each critical task item; and (iii) recommend to fine tune or find a balanced risk, budget, and timing for the project tasks in case of any unbalanced measure is found in the statistics and reports. (iv) acquire (i.e., receive) sign off and announce project development kick-off.

The nodes in the computing environment of FIG. 1 are the computer system/server which are in the form of a general-purpose computing device. The components of a computer system/server may include, but are not limited to, one or more processors or processing units, a system memory, and a bus that couples various system components including system memory to one or more processors a secure internal Claud space providing access to the computer environment and secure channels for external data extraction for authorized users.

Computer bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server typically includes a variety of computer system readable media. Such media may be any available media that is accessible by a computer system/server, and it includes both volatile and non-volatile media, removable and non-removable media. Cloud servers are virtual (not physical) servers that can work in a cloud computing environment, which is accessible to theoretically an unlimited number of users, to store data and run applications and for the AI systems to store documentations and reports. A physical server (not virtual), which runs on Windows, Linux or any other operating system, has a motherboard, CPU, RAM, and storage accessible to a single user, to store data and run applications. The physical server allows storage and access of information over a network by collecting and sharing information with other computers through either a local area network (LAN) or a wide area network (WAN).

System memory can include computer system readable media in the form of volatile memory, such as random-access memory (RAM) and/or cache memory. Computer system/server may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus by one or more data media interfaces. As will be further depicted and described below, the memory may include at least one program product having a set (e.g., at least one) of program modules that are configured to carry out the functions of embodiments of the invention.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Computer system/server may also communicate with one or more external devices, such as a keyboard, a pointing device, a display, etc.; one or more devices that enable a user to interact with a computer system/server; and/or any devices (e.g., network card, modem, etc.) that enable computer system/server to communicate with one or more other computing devices. Such communication can occur via Input/Output (I/O) interfaces. Still, a computer system/server can communicate with one or more networks such as a local area network (LAN), a general wide area network (WAN), and/or a public network (e.g., the Internet) via network adapter. A network adapter communicates with the other components of the computer system/server via the bus. It should be understood that although not shown, other hardware and/or software components could be used in conjunction with the computer system/server. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, includes non-transitory signals that transmit instructions to perform one or more functions. The computer readable storage medium is not to be construed as being transitory signals per set, such as radio waves or other freely propagating electromagnetic waves, electromagnetic waves propagating through a waveguide or other transmission media (e.g., light pulses passing through a fiber-optic cable), or electrical signals transmitted through a wire. The computer readable storage medium can also be cloud based to achieve cloud data management. Cloud data management is the practice of storing data at an offsite data center, thereby providing an automated backup strategy, professional support, and ease of access from any location (e.g., a computing environment in which device 101 containing module 105 resides or other locations).

Computer readable program instructions described herein can be downloaded to respective computing/processing devices from a computer readable storage medium or to an external computer or external storage device via a secure network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. A note here that the external networks communication with internal projects or systems and methods herein are only one way transmissions, which means there is no path from internal data extraction units and processors towards external project or company memory or processor spaces. That is, the project will have assigned internal and external memory and processor spaces. The Project team may ask for permission to receive data from external modules but external modules cannot receive data from internal modules. This setup can be propagated and implemented for multiple projects within a company with other provisional and security protocols that are out of the scope of this invention.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical applications, or technical improvement over technologies found in the marketplace, or to enable others of ordinary skill in the art to understand the embodiments disclosed herein.

What is claimed is:

1. A computer system configured to control artificial intelligence operations when applied to project management, the computer system comprising:

a plurality of databases;

multiple interconnected graphical user interfaces (GUIs) connected to the plurality of databases;

at least one physical processor configured to execute the GUIs; and a memory on which are stored machine-readable instructions that when executed by the processor, cause the processor to:

connect to artificial intelligence modules and an AI observer overseeing the artificial intelligence and assigned tasks inputs, outputs and schedule variables and modules;

receive inputs as structured and unstructured data for project requirements;

connect to the plurality of databases, thereby constructing recommendations pertaining to tasks and defined procedures;

record a first set of requirements;

support users to determine the project milestones along the feasibility studies and task assignments;

perform, record, or perform and record automatic steps for project feasibility analysis and task assignment process as described;

create an automatic cycle, thereby running the automatic cycle to gather required critical tasks from project leads;

recommend a set of tasks and subtasks for each task of the set of tasks, based on the first set of requirements;

make confirmations of the set of tasks to create a first report type;

automatically cycle through task-leads to obtain a second set of requirements, thereby gathering the subtasks for each task of the set of times and subtask timing and risks associated with subtasks;

enforce the defined alignment strategies through the process of task feasibility and planning;

detect a lack of focus on tasks and send warnings and solutions to regain focus before continuing on a task at hand;

update the first report type, based on the second set of requirements;

create a second report type;

analyze contents of the second type of report and update the reports;

connect to the GUI, thereby initiating task dependency and interdependency analysis;

create clusters of subtasks, based on the task dependency and interdependency analysis;

determine risks in the clusters, thereby determining tasks among the set of tasks which are of a probability of being high risk and associated subtasks of the tasks determined to have a probability of being high risk, as failure modes;

create multiple layers connecting tasks creating the project path towards meeting requirements along with dynamic projections of current project progress;

access to calendar and emails of the stakeholders, to share project reports and alignments, thereby updating recommendations, considering network security and defined data sharing, and strategy associated with the alignments;

perform hypothesis testing, thereby confirming if the tasks determined to have the probability of being high risk as failure modes are risky;

create and maintain and update general and comprehensive risk reports of each team member, thereby performing human risk analysis;

create a third type of report, based on the hypothesis testing;

initiate mitigation planning for the set of tasks and the subtasks of each task of the set of tasks, based on the third type of report;

create a fourth type of report, based on the mitigation planning of the set of tasks and the subtasks of each task of the set of tasks;

initiate project development kickoff;

and enforce a plurality of protocols, thereby controlling the artificial intelligence techniques and tasks delivery progression and schedules, before and after the project development kickoff.

2. The computer system of claim 1, wherein the first set of requirements comprises: Significance level (a) and Power of Test (B); Maximum Acceptable Risk Level (MARL); and Acceptable Probability of Failure (APOF).

3. The computer system of claim 1, further comprising machine-readable instructions that when executed by the processor, cause the processor to: provide observability to project deadlines, financial thresholds, and other project requirements with prediction capabilities providing more visibility to project decision makers.

4. The computer system of claim 3, wherein the finance and time thresholds each has a first knub, a second knub, and a third knub, wherein the first knub is a minimum threshold, the second floating knub as a middle threshold, and the third knub is a maximum budget threshold.

5. The computer system of claim 1, further comprising machine-readable instructions that when executed by the processor, cause the processor to: to create two consecutive report sheets for task feasibility and assignment to be used by and shared with project stakeholders, based on defined communication strategy.

6. The computer system of claim 1, further comprising machine-readable instructions that when executed by the processor, cause the processor to: recursively inspect each subtask for each task of the set of tasks with timing value (budget) φ_ij and a sub-task timing control value as $\tau=\Phi/\Pi$, where $\tau=\Phi$ is a total media critical task completion time, and II is the total number of subtasks under media critical task.

7. The computer system of claim 6, wherein each subtask comprises determination of task-leads selection, based on low performing outlier elimination methods in statistics and population analysis.

8. The computer system of claim 1, further comprising machine-readable instructions that when executed by the processor, cause the processor to: initiate risk mitigation, where newly devised tasks undergo risk mitigation, instead of original tasks, if high-risk subtasks are determined not to be alleviated.

9. The computer system of claim 1, wherein the protocol comprises a respective protocol configured for:

honest human decision making and execution;
internal data control;
data merge control;
data preservation and encapsulation;
task automation confirmation;
human focus analysis;
code correction;
automation external safety analysis; and
human imagination enforcement.

10. The computer system of claim 1, wherein the AI observer enforces a first set of protocols, a second set of protocols, and a third set of protocols, wherein the first set of protocols, the second set of protocols, and the third set of protocols are dynamic, thereby updating outputs and functional protocols in real-time via open-loop controlled methods for reports and alignments and closed-loop controlled methods for recommendations on project planning and projections on timeline and budget and other requirements delivery.

11. The computer system of claim 1, wherein the artificial intelligence techniques having at least one or more layers connected to a front-end, middle-end, and back-end of a platform.

12. The computer system of claim 11, wherein the back-end is configured for data integration, front-end-level data access and data security manager, data post-processing, data reporting, and a mid-end that covers a communications system.

13. The computer system of claim 12, wherein the data integration comprises sublayers for data storage management, data pre-processing, data classification, sub-layers data access and security managers, and artificial intelligence communications.

14. A computer-implemented method for controlling artificial intelligence when applied to project management, wherein the computer-implemented method comprises:

connecting to artificial intelligence modules and an AI observer executed on a processor overseeing the artificial intelligence and assigned tasks inputs, outputs and schedule variables and modules;

receiving, by the processor, inputs as structured and unstructured data for project requirements;

connecting to a plurality of databases, thereby constructing recommendations pertaining to tasks and their assignment routines as per defined procedures and flowcharts;

recording, by the processor, a first set of requirements;

supporting users to determine the project milestones along the feasibility studies and task assignments;

performing, by the processor, recording, or performing and recording automatic steps for project feasibility analysis and task assignment process as described;

creating, by the processor, an automatic cycle, thereby running the automatic cycle to gather required critical tasks from project leads;

recommending, by the processor, a set of tasks and subtasks for each task of the set of tasks, based on the first set of requirements;

making confirmations of the set of tasks to create a first report type;

automatically cycling, by the processor, through task-leads to obtain a second set of requirements, thereby gathering the subtasks for each task of the set of times and subtask timing and risks associated with subtasks;

enforcing the defined alignment strategies through the process of task feasibility and planning;

detecting a lack of focus on tasks and send warnings and solutions to regain focus before continuing on a task or event in progress;

updating the first report type, based on the second set of requirements;

cycling through project stakeholders to create a second report type;

analyzing contents of the second type of report;

connecting to the GUI, thereby initiating task dependency and interdependency analysis;

creating clusters of subtasks, based on the task dependency and interdependency analysis;

determining risks in the clusters, thereby determining tasks among the set of tasks which are of a probability of being high risk and associated subtasks of the tasks determined to have a probability of being high risk, as failure modes;

creating multiple layers connecting tasks creating the project path towards meeting requirements along with dynamic projections of current project progress;

accessing calendar and emails of the stakeholders, to share project reports and alignments, thereby updating recommendations, considering network security and defined data sharing, and strategy associated with the alignments;

performing hypothesis testing, thereby confirming if the tasks determined to have the probability of being high risk as failure modes are risky;

creating, maintaining, and updating general and comprehensive risk reports of each team member, thereby performing human risk analysis;

creating a third type of report, based on the hypothesis testing;

initiating mitigation planning for the set of tasks and the subtasks of each task of the set of tasks, based on the third type of report;

creating a fourth type of report, based on the mitigation planning of the set of tasks and the subtasks of each task of the set of tasks;

initiating project development kickoff; and finally enforcing a plurality of protocols, thereby controlling the artificial intelligence techniques and tasks delivery progression and schedules, before and after the project development kickoff.

15. The computer-implemented method of claim 14, wherein the protocol comprises a respective protocol configured for enforcing:

honest human decision making and execution;
internal data control;
data merge control;
data preservation and encapsulation;
task automation confirmation;
human focus analysis;
code correction;
automation external safety analysis; and
human imagination enforcement;

such that input into the protocol, output from the protocol, and security measures in the protocol are maintained without modification by AI and are recorded by observer AI modification is only allowed by a human, in special cases, and if sufficient evidence and alignments are provided, recorded, and processed by observer AI; and observer AI as a separate entity that has predefined functions to create reports and provide feedback to the other human and AI networks, which runs strictly by the AI and with no human intervention.

16. The computer-implemented method of claim 14, wherein the AI observer or observer AI enforces a first set of protocols, a second set of protocols, a third set of protocols, wherein the first set of protocols, the second set of protocols, the third set of protocols are dynamic, for active recommendations and report generation through the process.

17. The computer-implemented method of claim 14, wherein the artificial intelligence techniques have one or more layers connected to a front, middle and back-end of a platform.

18. The computer-implemented method of claim 17, wherein the back-end is configured for data integration, front-end-level data access and data security manager, data post-processing, data reporting, and the mid-end is configured for being a communications system.

19. The computer-implemented method of claim 14, wherein the first report type contains task lists under each critical task and respective sub-task, and the second report type contains at least tasks leads and risks associated with each respective sub-task.

* * * * *